Figure 9:
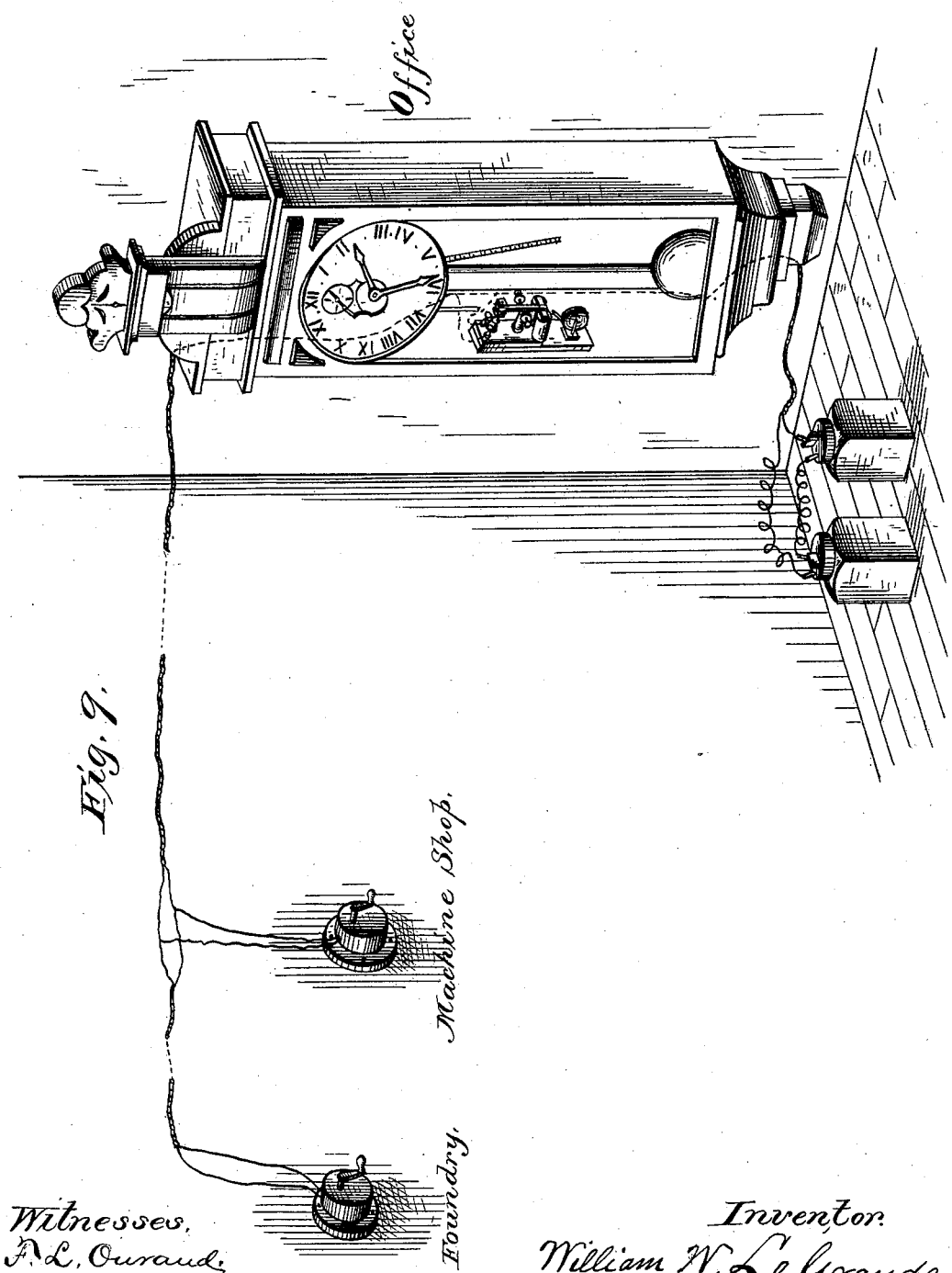

(No Model.)　　　　　　　　　　　　　　　　5 Sheets—Sheet 1.
W. W. LE GRANDE.
WATCHMAN'S TIME RECORDER AND REGISTER.
No. 303,298.　　　　　　　　　　Patented Aug. 12, 1884.
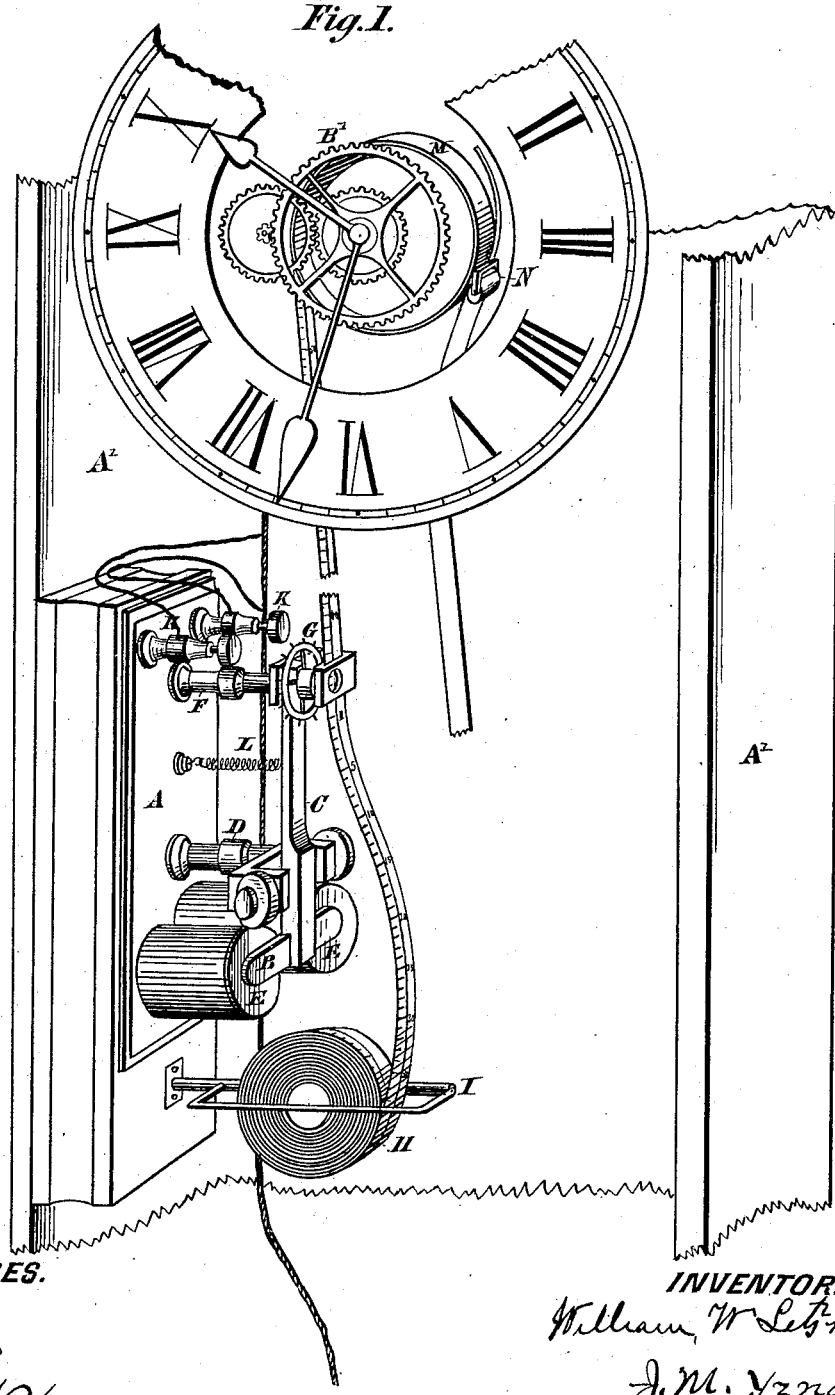
WITNESSES.　　　　　　　　　　　　　　　INVENTOR.

(No Model.)
5 Sheets—Sheet 2.
W. W. LE GRANDE.
WATCHMAN'S TIME RECORDER AND REGISTER.
No. 303,298. Patented Aug. 12, 1884.
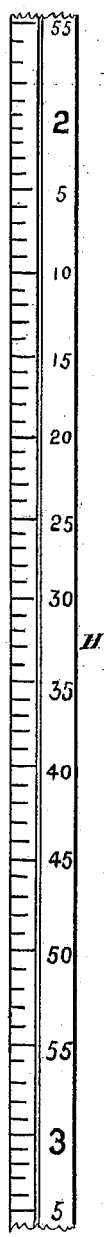
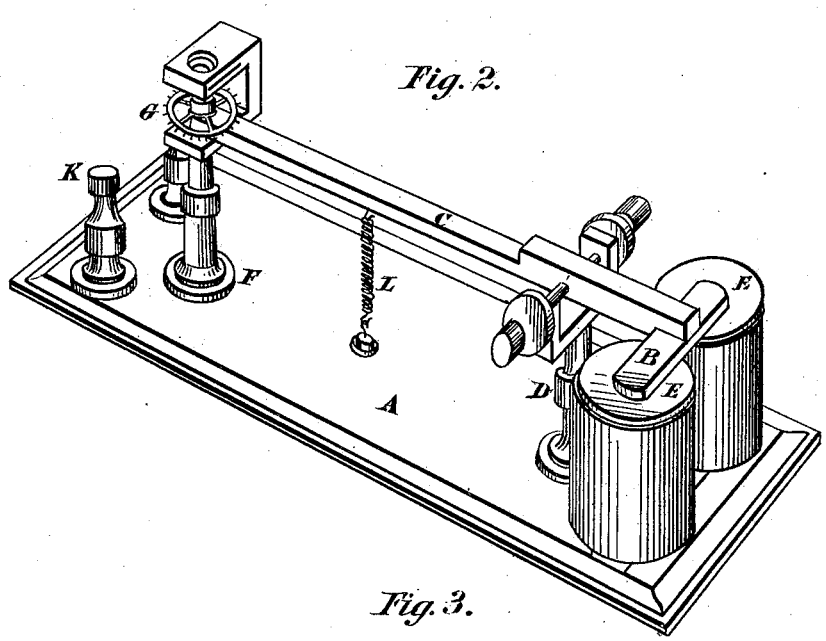
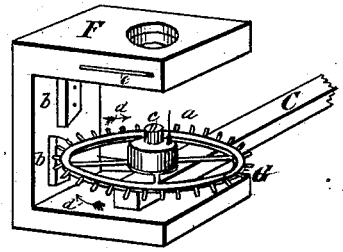
WITNESSES.
INVENTOR (No Model.)  W. W. LE GRANDE.  5 Sheets—Sheet 3.
WATCHMAN'S TIME RECORDER AND REGISTER.
No. 303,298.  Patented Aug. 12, 1884.
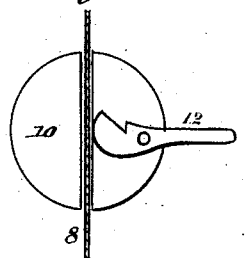
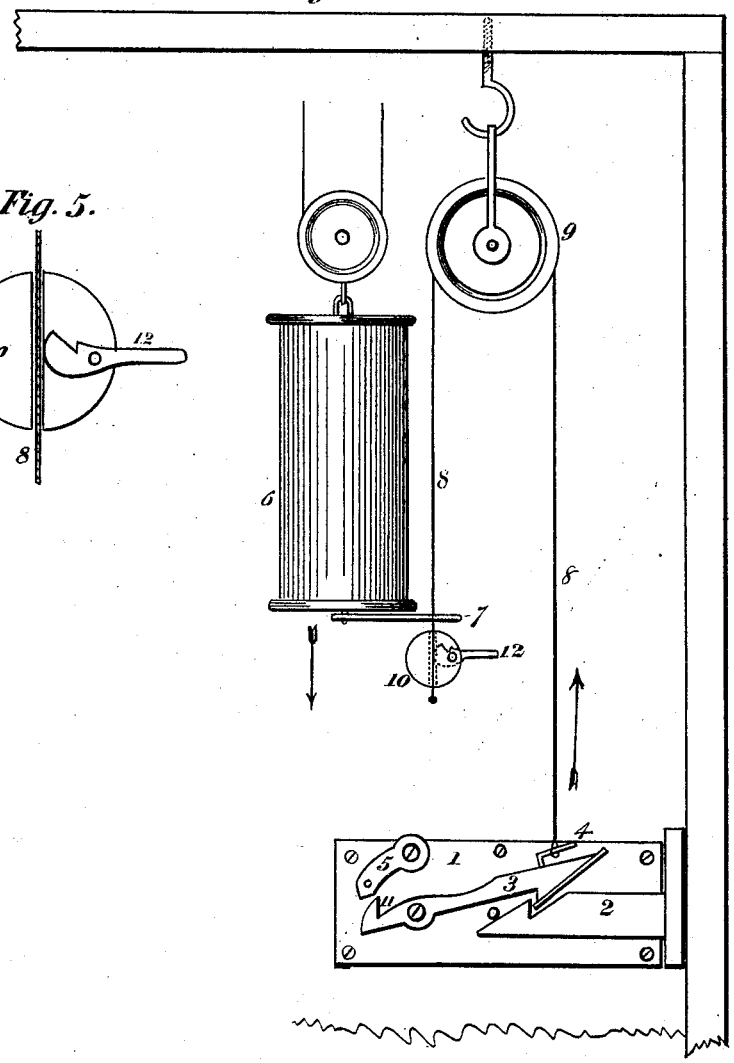
WITNESSES.
INVENTOR.

(No Model.) 5 Sheets—Sheet 4.
W. W. LE GRANDE.
WATCHMAN'S TIME RECORDER AND REGISTER.
No. 303,298. Patented Aug. 12, 1884.
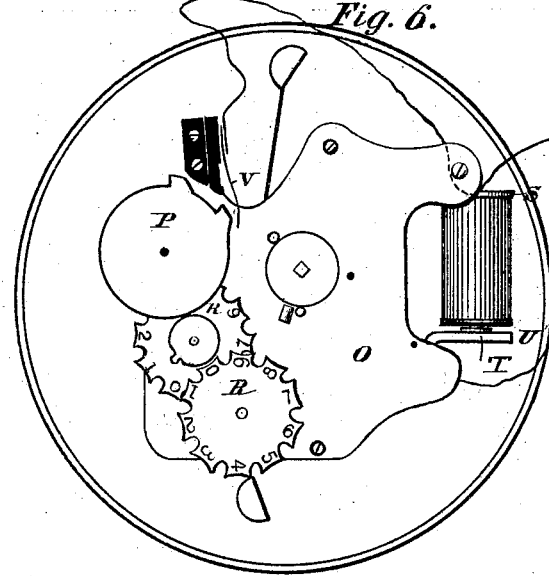
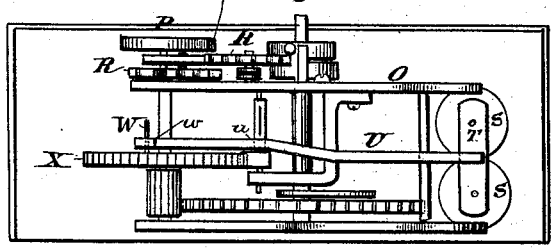
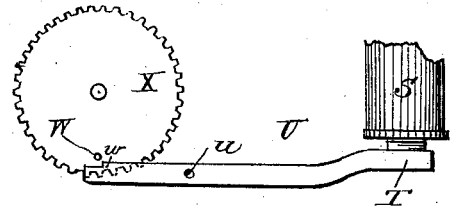
WITNESSES.
INVENTOR
William W. LeGrande
J. M. Yznaga
atty.

(No Model.)

W. W. LE GRANDE.
WATCHMAN'S TIME RECORDER AND REGISTER.

No. 303,298. Patented Aug. 12, 1884.

Witnesses.
F. L. Ouraud.
S. A. Kane.

Inventor.
William W. Le Grande
by J. M. Yznaga
atty.

UNITED STATES PATENT OFFICE.

WILLIAM W. LE GRANDE, OF LOUISVILLE, KENTUCKY, ASSIGNOR TO GEORGE WASHINGTON BURTON, OF SAME PLACE.

WATCHMAN'S TIME RECORDER AND REGISTER.

SPECIFICATION forming part of Letters Patent No. 303,298, dated August 12, 1884.

Application filed January 10, 1882. (No model.)

*To all whom it may concern:*

Be it known that I, WILLIAM W. LE GRANDE, a citizen of the United States of America, residing at Louisville, in the county of Jefferson and State of Kentucky, have invented certain new and useful Improvements in Watchmen's Clocks, of which the following is a specification, reference being had therein to the accompanying drawings.

My invention relates to that class of watchmen's time-detectors in which electricity is employed as an agent for the purpose of transmitting signals from station-boxes to a clock provided with means for recording such signals therein.

Heretofore watchmen's time-detectors or watchmen's clocks in which electricity is used have been constructed with expensive and complicated movements, having either a weight or spring as their motor power for recording the number of stations visited. These movements require winding up, and are set in motion by the electric current being made or broken at the station-box, and if the movement fails to operate the watchman might send in his report regularly and no record of the same would be made. Another objection to this class of clocks now in use is that the station-box from which the record is sent in bears no evidence of the watchman's visit. This is a very serious objection, as any one, however slightly acquainted with the electric current, if employed as a watchman, could register falsely by simply forming or breaking the circuit at some convenient point on the wires, and thus avoid the necessity of visiting any of the station-boxes. Another objection to watchmen's clocks now in use is that a revolving disk of paper is carried by the main arbor, or a secondary arbor deriving its motion from the main or center arbor of the train, and the movement is liable to be injured by the daily removal of these disks. Another objection to those now in use is the liability of the locks thereon being picked, and thereby allowing the watchman access to the record. On some of them duplicate keys may be used for false registration. I have overcome these and other objections to watchmen's clocks now in use, and have constructed what is known as an "electro-magnetic watchman's clock," possessing the following characteristics: first, a recording device placed on the inside of the clock-case, that is operated solely by electro-magnetic force, that will record the number of each station visited and operated by the watchman on a paper tape, or other suitable material, showing the time of each visit to each station, both day and night; second, a station-box, in connection with said clock, that will, when operated, cause to be transmitted by electric vibrations or pulsations its number to the recording-instrument in the clock, and at the same time register within itself the number of visits made to it; third, a tape or ribbon made of paper or other suitable material, and properly graduated and marked to indicate the hours and minutes, and moved through the recording-instrument by the clock-train; fourth, a time-locking device that will lock the sash to the case by simply closing the sash, and that cannot be unlocked except by the action of the clock-train.

My improvements consist in the novel construction and combination of parts, as will be hereinafter more fully set forth, and pointed out in the claims.

To enable others skilled in the art to make and use my invention, I have prepared the following description thereof, reference being had to the drawings, in which—

Figure 1 is a perspective view showing a section of a clock-case with front of a movement, a drum, friction-roller, and a recording device below the movement. Fig. 2 is a perspective view of the recording device. Fig. 3 is an enlarged detail view of a portion of the recording device, showing a scape-wheel, puncturing-pin, and fixed pallets. Fig. 4 is an elevation of locking device. Fig. 5 is an enlarged detail view showing pawl with friction-clutch. Fig. 6 is a view of the internal mechanism of a station-box. Fig. 7 is a plan or end view of same. Fig. 7½ is a detail view of the locking device. Fig. 8 shows a section of the marked tape or ribbon. Fig. 9 is a perspective view of a clock, with recording device, station-boxes, and battery.

In practice I prefer a large p : dulum-movement, though a marine movement may be used, placed in a suitable case. Upon the main arbor or center of the train of this clock-movement (see Fig. 1) I place a plain or flanged wheel or drum, M, over which the paper or tape ribbon H is passed, and held against it by means of the pressure or tension roller N, properly suspended. This is the only attachment I make to the clock-movement.

The recording device, as shown in Figs. 1, 2, 3, and 9, consists of an electro-magnet, E, armature B, armature-lever C, guide-posts D and F, binding-posts K K, scape-wheel G, pallets $b$ $b$, puncturing-pin $a$, attached to hub of scape-wheel, and retractile spring L, all mounted and organized on base A, in the manner shown in the drawings. Below the recording means is secured a post or frame, I, which carries the paper tape-roll H. The upper end of the armature-bar C is provided with a scape-wheel, G, secured thereto by means of the screw $c$, so as to freely revolve on said screw.

By reference to Fig. 3 of the drawings, it will be seen that one outward movement of the armature-lever C will bring one tooth of the scape-wheel G in contact with the incline of the upper or outer pallet, $b$, which will cause the wheel G to perform a partial rotation, and on its inward motion the next tooth on the scape-wheel will be moved the same distance by coming in contact with the inclined surface of the lower or inner pallet, $b$. Thus each movement of the armature C, in obedience to a break or connection of the electric circuit through magnet E E, will cause the scape-wheel G to rotate in the direction indicated by the arrow $d$ one tooth. This will place the puncturing-pin $a$ at a different place each break or connection, and as the paper tape passes from the roll on frame I through the slot $e$ in upright post F, as shown, each vibration of the armature-lever C will cause the puncturing-pin $a$ to puncture a hole in a different place in the paper tape.

I have also constructed a box to avoid false registration and insure the watchman visiting each station, as shown in Figs. 6 and 7, which consists of the movement O, circuit-breaker P, and registering-wheels R R. The latter are intended to show how often the box has been operated, or the number of visits and "turns-in" the watchman makes to each box. Several of these wheels, similarly arranged, may be placed in each box, and thus have a much larger number of visits recorded before the wheels are at zero again. To prevent the watchman cutting out a box, and turning up these wheels so as to make false registration, I add to each box a magnet, S S, armature T, and armature-lever U, with a notch at its outer end to work in conjunction with the pin W on the wheel X, as shown in Fig. 7 of the drawings. The circuit passes from one pole of the battery through the clock; thence through magnet S S, and to the connecting-spring V, and from the other pole of the battery to movement O, through which it is continued to the circuit-breaker P, as shown in Fig. 6, the two wires leading directly to the terminal box, while branches from the wires, respectively, lead to the intermediate boxes. The armature-lever U is pivoted at $u$, its long arm carrying the armature T, and having such weight as, when free, to overbalance and throw upward the short arm, so that the shoulder $w$ will be brought into position to be struck by pin W, which action will obviously lock the train; but when the armature is attracted by magnet S the short arm of the lever will be moved downward to carry the shoulder $w$ out of the way of pin W, and thus permit the wheel X to turn and the train to move to operate the circuit-breaker P and register-wheels. The pin W and the first tooth of the circuit-breaker are so arranged with relation to each other that the said first tooth may always be brought in contact with the spring V just before the pin would strike the shoulder $w$, and thus close the circuit through the magnet S, so as to move the lever to permit the pin to pass said shoulder, and thus a revolution of the circuit-breaker may be completed before the pin will again come to the shoulder; but if the magnet should be short-circuited it, of course, will not attract its armature; and although the first tooth of the circuit-breaker might be brought to contact with the spring V, the shoulder $w$ would not be moved out of the path of the pin W, and the train would therefore be locked, so that the register-wheels could not be turned. Thus, it will be seen, that if the watchman should short-circuit the box, so that his tampering therewith would not be discovered by makes and breaks operating the registering apparatus at the clock, he would at the same time cause the locking of the register-wheels, so that he could not make a false registration or cause the register to indicate that he had visited the box at times when there would be no corresponding record at the clock.

From the foregoing description, and reference to Figs. 6, 7, and 9 of the drawings, it will be observed that, in my system of detecting watchmen, I employ an electric signal-transmitting apparatus, circuit-controlling devices, an automatic register for indicating the number of times said signal-transmitting apparatus has been visited and operated, and said signal-transmitting apparatus being provided with a locking device arranged to lock said register, and an electro-magnet arranged in circuit to operate said locking device and unlock the register only when the circuit is complete; also that the electric signal-transmitting apparatus, with the make-and-break means, is provided with a train of gearing to operate said make-and-break devices automatically, and also provided with an automatic locking device arranged to unlock and permit the operation of the gearing when an electric current is flowing through the transmitting signal-box.

Operation: Now, if an electric circuit is completed from binding-posts K K through a factory, and at such places as may be selected, station-boxes be placed that will make each a different number of connections, (this instrument being constructed for an open circuit,) and a watchman required to visit each box at stated times and operate it, the box making one connection will, by closing the circuit temporarily once, cause the magnet of the recording-instrument in the clock to attract the armature, and thus puncture one hole in the tape; while box No. 2 (or that which makes two connections) will send two pulsations, and thereby cause two holes to be punctured in the paper tape; and in the same way any number of connections may be arranged, not exceeding the number of teeth in the scape-wheel G; and as the paper tape is graduated by proper time-marks, as shown in Fig. 8, and moved by the clock-train the time-mark at the point of the tape in coincidence with the puncturing-point coincides with the time indicated on the dial of the clock, and thus the time marked on the paper at the recording-instrument corresponds to the time indicated on the dial; and thus the number of each box and the time when it was operated will be recorded on the paper tape simultaneously with its registration at the box whence the signal was sent. The recording at the central station and the registration at the transmitter-boxes thus act as checks upon each other, the register at the transmitter being evidence of the number of visits made thereto by the watchman, while the central-office devices not only record the number but also the time at which the visits were made. If the record and the register should disagree it would be evident that the apparatus had been tampered with. When there are a series of transmitting-boxes in the main line, each will send a particular signal, which designates the box from which it was sent, and such signals can be readily distinguished from each other on the record-strip. Therefore, by inspecting the record at any time, it can readily be seen how many times and at what times any particular box has been visited.

To avoid the picking of lock on the clock-case, and thus giving access to the record, I have constructed a time-lock, as shown in Figs. 4 and 5. This consists of the plate 1, the stationary latch 2, the movable latch 3, with its hook 4 and pawl 5. To the lower end of weight 6 is secured an eyelet, 7, through which the cord 8 passes. This cord passes over the pulley 9, and is connected to the hook 4, as shown. To the lower end of this cord is secured a limit-ball, 10. When the weight descends, the eyelet 7 will come in contact with ball 10, thus raising the latch 3 by means of the cord until the pawl 5 drops into the notch 11, and thus holding it unlocked. The ball may be raised to any point on the card and held there by the eccentric friction-dog 12, thus allowing the time for which it may be set to open to be arranged as desired.

It will be observed by reference to Fig. 1 of the drawings that the station or signal boxes are in electric circuit with the recording means located within the clock-case at the office; but it is obvious that the clock and recording means may be located elsewhere to suit the convenience of the superintendent or foreman or other person of the factory or shop whose duty it may be to examine the record and inspect the boxes.

It also will be observed that the recording-device tape or ribbon, which is graduated to indicate intervals of time, passes over the drum, receiving motion from the clock-movement, and is so adjusted as to move with relation to the recording device isochronally with the clock-movement, so that whenever a signal is turned in from a box the recording on the tape will indicate the exact time when the station-box was visited and operated.

Having thus fully described my invention, what I claim as new, and desire to secure by Letters Patent, is—

1. In a watchman's electric control system, the combination, in an electric circuit, of an electro-magnetic recording apparatus at a main station, and one or more signal-transmitting devices at one or more outlying stations arranged to operate said recording apparatus, and each having within itself means for indicating the number of times it has been actuated, substantially as described.

2. In a watchman's electric control system, the combination, in an electric circuit, of an electric recording apparatus at a main station, one or more signal-transmitting devices at an outlying station or stations, and registering mechanism connected with each signal-transmitting device, independently of the main-station recording apparatus, for indicating the number of times each transmitting device is operated.

3. In a watchman's electric control system, the combination, in an electric circuit, of an electric recording apparatus at a main station, a time mechanism arranged to operate the record receiver or strip, and one or more signal-transmitting devices at one or more outlying stations, each of said signal-transmitting devices being provided with registering devices for registering the number of signals, substantially as described.

4. In a watchman's electric control system, the combination, in an electric circuit, of an electro-magnetic recording apparatus at a main station, and a series of signal-transmitting devices at a series of outlying stations, each of said outlying transmitting devices being adapted to send a signal different from those of all other transmitting devices in the same circuit, and each being provided with registering mechanism for registering the number of signals sent from it, substantially as described.

5. In an electric signal-transmitting apparatus, the combination, with the circuit-controlling devices, and an automatic register for indicating the number of times said devices are operated, of a locking-lever, U, constructed with an armature at one end and a notch or shoulder at the other end, arranged to lock said register, and a separate electro-magnet arranged to operate said locking-lever and unlock the register only when the circuit is complete and an electric circuit flows through the apparatus, substantially as described.

6. The combination, with the make-and-break devices, of an electric signal-transmitting apparatus, and a train of gearing arranged to operate said device automatically, of an automatic lock composed of the lever U, carrying an armature at one end, to co-operate with an electro-magnet, and constructed at the other end with a notch or shoulder to engage and co-operate with a side pin, W, on the gear-wheel X, arranged to unlock and permit the operation of said train only when an electric current is flowing through the apparatus.

7. In a watchman's detector, the combination, with a time-movement provided with a cylinder or drum mounted on the main arbor, and a graduated record-receiver passing over the cylinder of the arbor, and controlled by the time-movement, of a series of signal-transmitting boxes, with automatic locking means in electric circuit, and a recording device located within the case of the time-movement for recording by direct electro-magnetic force the number of a station-box in circuit therewith when turned in, substantially as described.

8. The combination of a clock-movement provided with a cylinder or drum mounted on the main arbor, a recording-tape graduated to indicate intervals of time, the mechanism receiving motion from the clock-movement for adjusting said tape with relation to the recording device, the electro-magnetic recording device, and means for transmitting signals, and devices for preventing false registration, in electric circuit with the recording device, all organized and arranged for operation substantially as described.

9. The combination, with the magnet E, armature B, and lever C, of the toothed wheel G, mounted on said lever, and having point $a$ projecting from its hub, the pallets $b\ b$, and a guide for a strip of paper in the path of said pointer, substantially as described.

In testimony whereof I affix my signature in presence of two witnesses.

WILLIAM W. LE GRANDE.

Witnesses:
WM. P. ADAMS,
FRED WEIHE, Jr.